(12) United States Patent
Ryan et al.

(10) Patent No.: US 9,316,484 B2
(45) Date of Patent: Apr. 19, 2016

(54) FRINGE SHIFT MEASUREMENT SYSTEM HAVING AN OPTICAL PHASE MASK WITH PHASE-SHIFTED FIRST AND SECOND HALVES

(71) Applicants: Thomas Patrick Ryan, Ann Arbor, MI (US); Donald Bobbitt Jones, Ann Arbor, MI (US)

(72) Inventors: Thomas Patrick Ryan, Ann Arbor, MI (US); Donald Bobbitt Jones, Ann Arbor, MI (US)

(*) Notice: Subject to any disclaimer, the term of this patent is extended or adjusted under 35 U.S.C. 154(b) by 13 days.

(21) Appl. No.: 14/438,913

(22) PCT Filed: Oct. 22, 2013

(86) PCT No.: PCT/US2013/066119
§ 371 (c)(1),
(2) Date: Apr. 28, 2015

(87) PCT Pub. No.: WO2014/070520
PCT Pub. Date: May 8, 2014

(65) Prior Publication Data
US 2015/0300805 A1    Oct. 22, 2015

Related U.S. Application Data

(60) Provisional application No. 61/720,532, filed on Oct. 31, 2012.

(51) Int. Cl.
*G01B 9/02* (2006.01)

(52) U.S. Cl.
CPC ................. *G01B 9/02041* (2013.01)

(58) Field of Classification Search
CPC .............. G01J 2009/0234; G01J 2009/0238; G01B 9/0201; G01B 9/02041
See application file for complete search history.

(56) References Cited

U.S. PATENT DOCUMENTS

| 4,836,681 A * | 6/1989 | Van Saders ............. G01J 9/02 250/237 G |
| 2004/0080754 A1 * | 4/2004 | Tobiason ........... G01B 9/02056 356/495 |

* cited by examiner

*Primary Examiner* — Hwa Lee
(74) *Attorney, Agent, or Firm* — MacMillan, Sobanski & Todd, LLC

(57) ABSTRACT

A fringe shift measurement system is provided and includes an optical phase mask configured to receive light fringes from optical flats. The optical phase mask has first and second halves, each half having alternating patterns of opaque rings and transparent rings. The first half pattern is phase-shifted with respect to the second half pattern. The first and second halves are configured to alternately block the light fringes or allow the light fringes to pass through the optical phase mask. A splitter is configured to direct the light fringes from the optical phase mask in desired directions. Concentrators are positioned to receive light fringes from the splitter and configured to focus the light fringes in a desired location. Detectors are configured to receive the focused light fringes from the concentrators and configured to convert the focused light fringes into digital signals. A control unit is configured to analyze the digital signals.

12 Claims, 16 Drawing Sheets

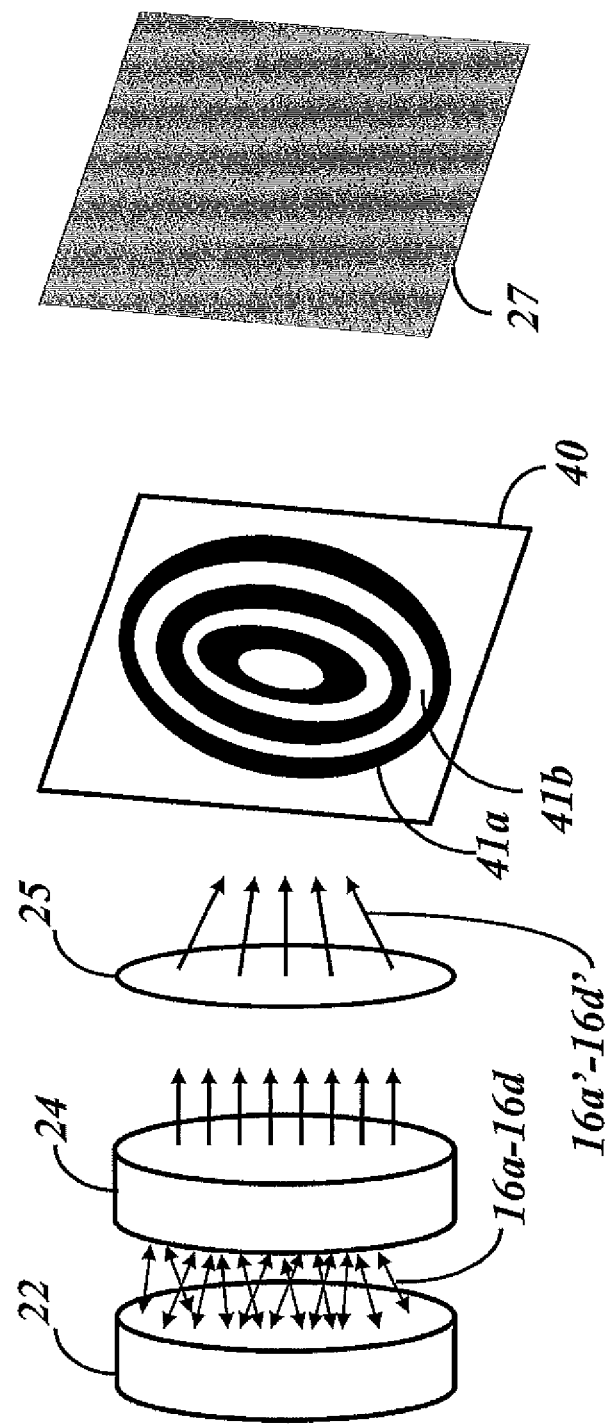

FRINGE SHIFT MEASUREMENT SYSTEM HAVING AN OPTICAL PHASE MASK WITH PHASE-SHIFTED FIRST AND SECOND HALVES

RELATED APPLICATIONS

This application claims the benefit of U.S. Provisional Patent Application 61/720,532, filed Oct. 31, 2012, the disclosure of which is incorporated herein by reference in its entirety.

BACKGROUND

Interferometry refers to a family of techniques in which waves, usually electromagnetic, are superimposed in order to extract information about the waves. Interferometry is an important investigative technique in the fields of astronomy, fiber optics, engineering metrology, optical metrology, oceanography, seismology, chemistry, quantum mechanics, nuclear and particle physics, plasma physics, remote sensing, bimolecular interactions, surface profiling, microfluidics, mechanical stress/strain measurement, and velocimetry.

Certain devices used for optical interferometry, such as the non-limiting example of Fabry-Perot interferometers, produce light or fringe patterns. Fringe patterns are the result of the principle of superposition, in which waves are combined in a way that will cause the result of their combination to have some meaningful property that is diagnostic of the original state of the waves. Most interferometers use light or some other form of electromagnetic wave.

Historically, analyzing fringe patterns, fringe locations and consequently fringe shifts relied upon methods of focusing an image of the fringes onto a multi-pixel detector, such as a charge coupled device (CCD) or a complementary metal oxide semiconductor (CMOS) camera sensor, and analyzing the fringe patterns to determine their radius from the fringe center. This method can be computationally intensive, expensive, and time consuming. Historical analysis methods can also produce low signal-to-noise ratios thereby making signal lights harder to detect since in use the signal lights are divided among many detector pixels, each of which adds its own noise to that of the signal. As a consequence, interferometers have suffered in the commercial market because of their inability to provide real-time data of the frequency shifts.

It would be advantageous if the analysis of fringe patterns could be improved.

SUMMARY OF THE INVENTION

The above objects, as well as other objects not specifically enumerated, are achieved by a fringe shift measurement system for determining the shift of fringes of an interferometer. The fringe shift measurement system includes an optical phase mask configured to receive light fringes from one or more optical flats. The optical phase mask has first and second halves, each of the first and second halves having alternating patterns of opaque rings and transparent rings. The first half pattern is phase-shifted with respect to the second half pattern. Each of the first and second halves is configured to alternately block the incoming light fringes or allow the incoming light fringes to pass through the optical phase mask. A splitter has a plurality of segments, each of the segments configured to direct incoming light fringes from the optical phase mask in a desired direction. A plurality of concentrators is positioned to receive light fringes from the splitter segments. The concentrators are further configured to focus the light fringes in a desired location. A plurality of detectors is configured to receive the focused light fringes from the concentrators and further configured to convert the focused light fringes into digital signals. A control unit is configured to compare and analyze the digital signals.

The above objects, as well as other objects not specifically enumerated, are also achieved by a method of using a fringe shift measurement system. The method includes the steps of transmitting reflected light returns to one or more optical flats, generating light fringes from the transmitting reflected light returns, imparting the light fringes onto an optical phase mask, blocking a portion of the light fringes imparted on the optical phase mask, allowing a portion of the light fringes imparted on the optical phase mask to pass through the optical phase mask and analyzing the light fringes passing through the optical phase mask.

Various objects and advantages of the fringe shift measurement system will become apparent to those skilled in the art from the following detailed description of the different embodiments, when read in light of the accompanying drawings.

BRIEF DESCRIPTION OF THE DRAWINGS

FIG. 4A is a schematic view of a first scenario of a fringe shift measurement system wherein a mask converts fringes into intensities and wherein an object is stationary relative to a light source.

FIG. 10-b is a front view of the phase shifted transmitted returns shown in FIG. 10a.

DETAILED DESCRIPTION OF THE INVENTION

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

The description and figures disclose a fringe shift measurement system. Generally, the fringe shift measurement system employs a mask to convert fringe positions to a plurality of intensities. The intensities are measured by means of single point detectors.

Referring now to FIGS. 1, 2, 3A and 3B, a conventional Fabry-Perot interferometer system for producing fringe patterns is illustrated. Fabry-Perot interferometer systems are well known in the art and will only be briefly described herein.

Figure 1:
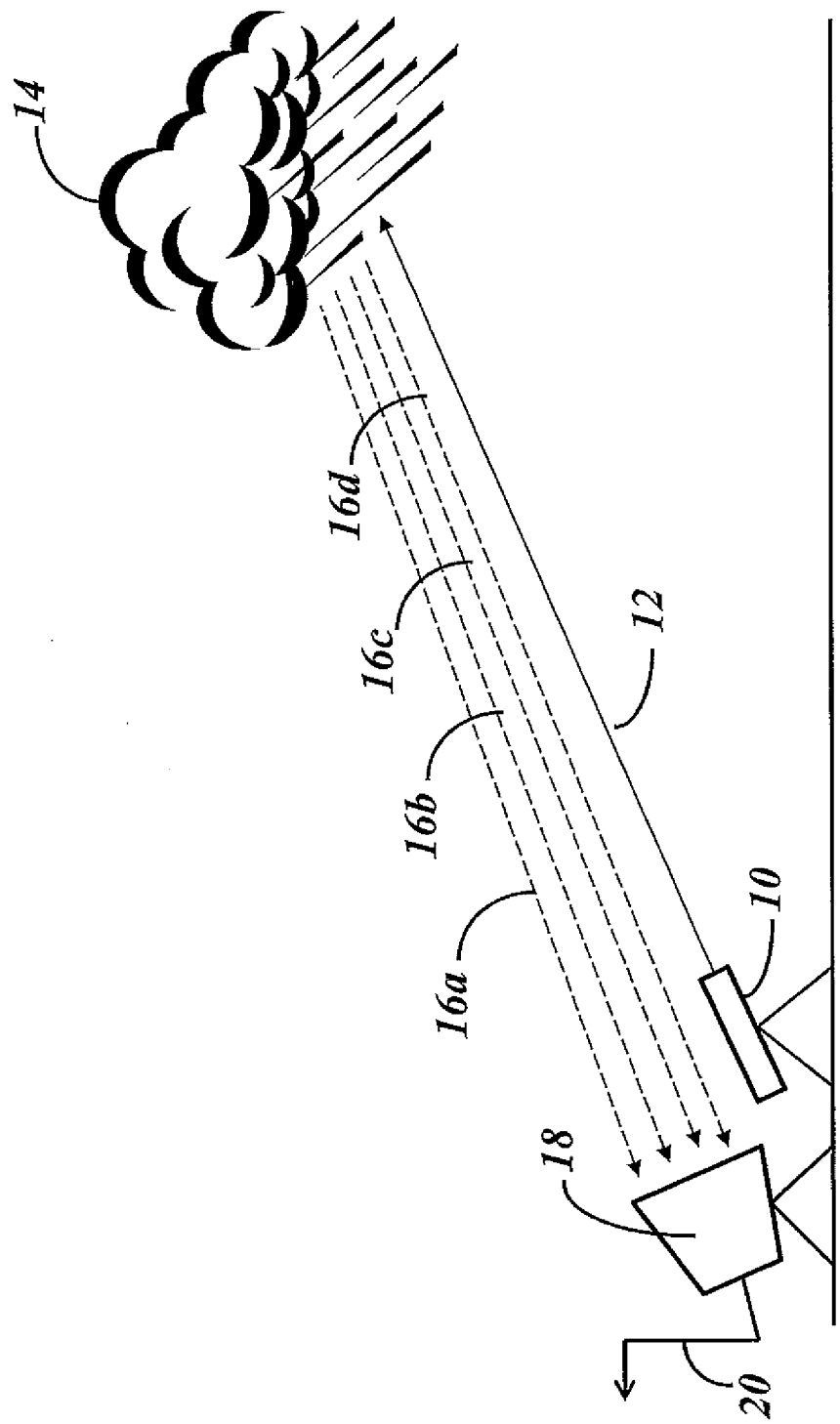
FIG. 1 is a schematic view of a portion of a prior art Fabry-Perot interferometer system illustrating returns from an object impacted by a beam of light.

Referring first to FIG. 1, a light source 10 provides a beam of light 12. In the illustrated embodiment, the light source 10 is a laser. However, in other embodiments, the light source 10 can be other devices, mechanisms, structures or combinations thereof. The beam of light 12 travels in a direction until the beam of light 12 contacts an object 14. In the illustrated embodiment, the object 14 is a cloud. Alternatively, the object 14 can be other items or structures, such as the non-limiting examples of wind shifts, birds, rain drops, atmospheric dust, molecules or aerosols.

Referring again to FIG. 1, portions of the beam of light 12 reflect off of the object 14 and form reflected light returns (hereafter "returns") 16a-16d. For purposes of simplicity, the embodiment illustrated in FIG. 1 shows the returns 16a-16d as segmented lines. The returns 16a-16d can have various wave forms, including sinusoidal wave forms. While the illustrated embodiment shows a quantity of four returns 16a-16d, it should be appreciated that more than four returns can be formed. The returns 16a-16d can be collected by a collector 18. In the illustrated embodiment, the collector 18 has the form of a metallic dish. However, in other embodiments, the collector 18 can have other forms.

The collector 18 conveys the collected returns 16a-16d into a conduit 20. The conduit 20 is configured to allow the collected returns 16a-16d to travel to downstream operations. In the illustrated embodiment, the conduit 20 is formed from one or more optic fibers. In other embodiments, the conduit 20 can be other devices, structures, mechanisms or combinations thereof.

Figure 2:
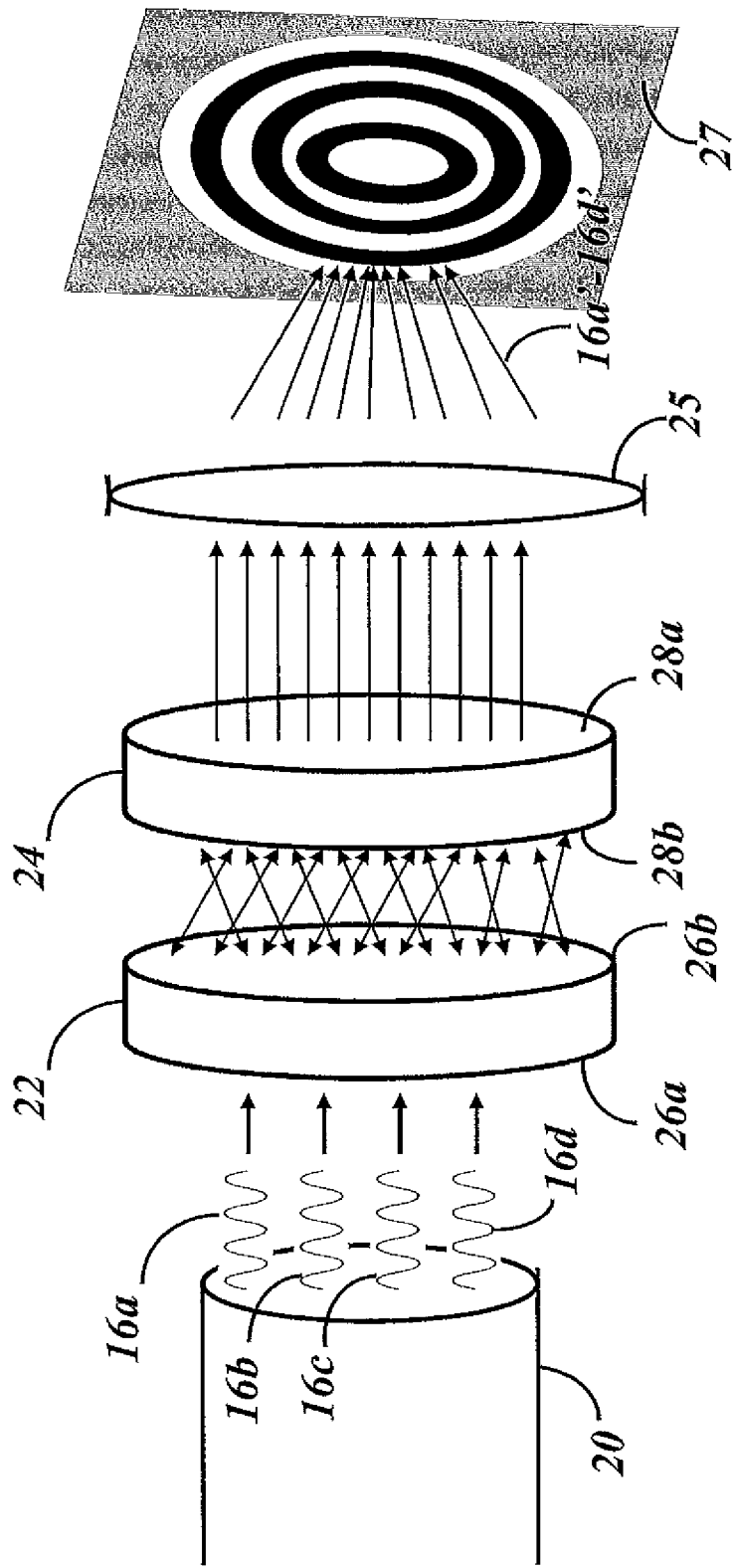
FIG. 2 is a schematic view of another portion of a prior art Fabry-Perot interferometer system illustrating the returns of FIG. 1 reflecting within opposed optical flats.

Referring now to FIG. 2, another portion of the Fabry-Perot interferometer system is illustrated. The conduit 20 is arranged to be substantially coaxial with a first optical flat 22 and a second optical flat 24. The first optical flat 22 has an outer surface 26a and an inner surface 26b. Similarly, the second optical flat 24 has an outer surface 28a and an inner surface 28b. In certain embodiments, the surfaces 26a and 26b of the first optical flat 22 are oriented to be substantially parallel to each other and the surfaces 28a and 28b of the second optical flat 24 are also oriented to be substantially parallel to each other. However, in other embodiments, the surfaces 26a, 26b and 28a, 28b can be oriented to be non-parallel to each other.

In the embodiment illustrated in FIG. 2, the inner surfaces 26b and 28b can have a reflective surface or coating configured to facilitate reflections of the returns 16a-16d between the inner surface 26b of the first flat 22 and the inner surface 28b of the second flat 24. Alternatively, the inner surfaces 26b and 28b can have other desired surfaces, coatings or combinations thereof configured to facilitate reflections of the returns 16a-16d between the inner surface 26b of the first flat 22 and the inner surface 28b of the second flat 24.

Referring again to FIG. 2, the conduit 20 is arranged such that the returns 16a-16d pass through the outer surface 26a of the first optical flat 22. The returns 16a-16d then reflect back and forth between the inner surface 26b of the first optical flat 22 and the inner surface 28b of the second optical flat 24. Each time the returns 16a-16d reach the inner surface 28b of the second optical flat 24, portions of the returns 16a-16d are transmitted through the second optical flat 24 and are focused by a lens 25 onto a surface 27. The portions of the returns 16a-16d transmitted through the second optical flat 24 form transmitted returns 16a'-16d'.

Figure 3A:
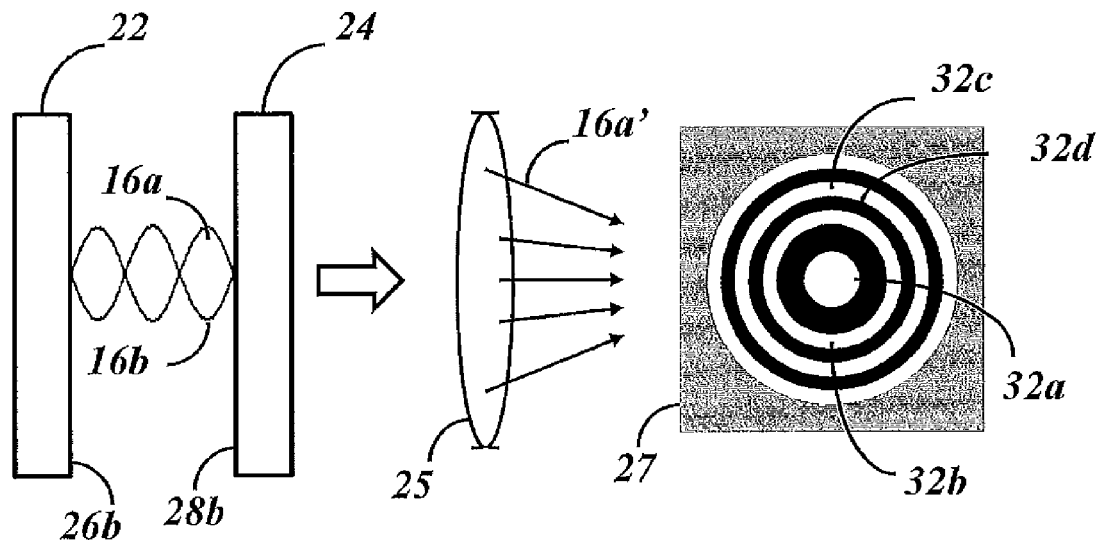
FIG. 3A is a schematic view of another portion of a prior art Fabry-Perot interferometer system illustrating the reflected returns of FIG. 2 intersecting such as to form a circular fringe pattern with a bright center.

Referring now to FIG. 3A, returns 16a and 16b are illustrated between the inner surface 26b of the first flat 22 and the inner surface 28b of the second flat 24. The returns 16a and 16b are in phase with each other and intersect at the inner surface 28b of the second flat 24 thereby forming a constructive return. Portions of the constructive return pass through the second flat 24 and are focused by the lens 25 such as to form a bright ring of light (light fringe) 32a on a surface 27. In similar fashions, other returns (not shown) intersect at the inner surface 28b of the second flat 24 and form other constructive return, and the constructive returns exit the second flat 24 and form other light fringes 32b-32d on the surface 27. As will be explained in more detail below, analysis of the light fringes 32a-32d can be used to provide useful information concerning the object 14 as shown in FIG. 1.

Figure 3B:
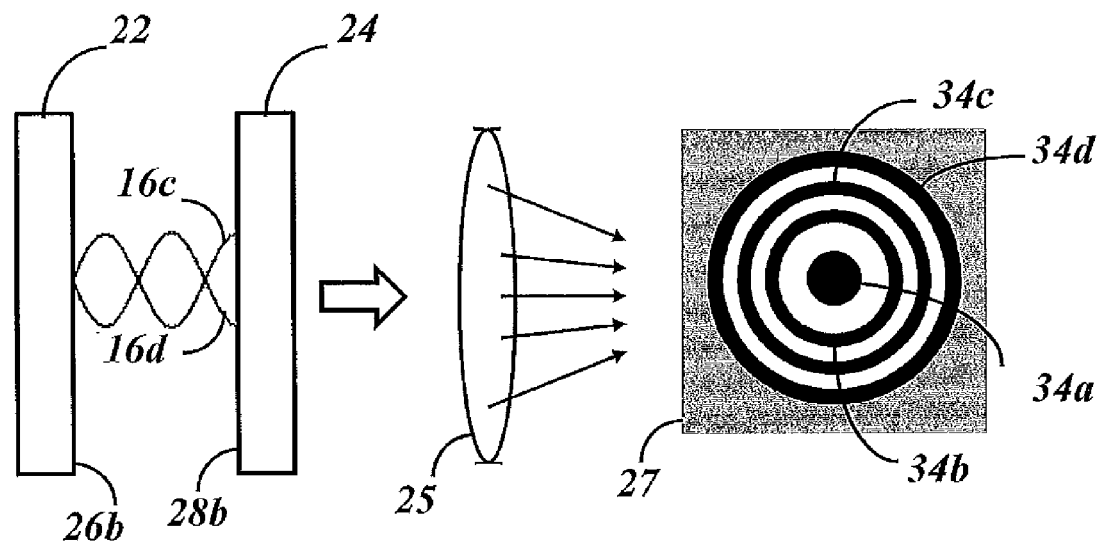
FIG. 3B is a schematic view of another portion of a prior art Fabry-Perot interferometer system illustrating the reflected returns of FIG. 2 in an out of phase mode and forming a circular fringe pattern with a dark center.

Referring now to FIG. 3B, in certain instance the returns reflecting back and forth between the inner surfaces 26b and 28b are out of phase with each other and do not form constructive returns. Returns 16e and 16d are illustrated between the inner surface 26b of the first flat 22 and the inner surface 28b of the second flat 24. The returns 16c and 16d do not intersect at the inner surface 28b of the second flat 24. In fact, the returns 16c and 16d are out of phase at the inner surface 28b of the second flat, thereby forming a destructive return. The destructive return provides an absence of light, which thereby forms a dark ring (dark fringe) 34a on the surface 27. In similar fashions, other returns (not shown) do not intersect at the inner surface 28b of the second flat 24 and the resulting absence of light forms other dark fringes 34b-34d on the surface 27.

While the embodiment of the first and second flats 22 and 24 shown in FIG. 3A has been described above as forming bright rings of light (light fringe) 32a on the surface 27, it should be understood that in other embodiments, the reflectivity of the inner surfaces 26b and 28b can be customized, such as to produce rings having desired characteristics. In one non-limiting example, the reflectively of the inner surfaces 26b and 28b of the first and second flats 22 and 24 can be customized to such as to produce extremely bright, narrow rings of light. The extremely bright, narrow rings of light, when coupled with a matching mask, can be used to optimize the sensitivity of the Fabry-Perot interferometer.

The returns interfere constructively or destructively with each other depending on the angle of the returns to the normal direction of the inner surfaces 26b and 28b of the first and second flats 22 and 24. This action produces a pattern of alternating light and dark fringes which are collimated at infinity.

The angle of the fringes from the optical axis depends on the wavelength of the light source and the spacing of the first and second flat 22 and 24, as shown in FIG. 2. As the frequency of the incoming light changes or the optical spacing of the optical flats change, the angles of the light and dark fringes emerging from the second flat 24 change. These light and dark fringes can be focused onto an image plane by appropriate lenses, and the resulting fringe diameters are a function of the frequency of the light.

As mentioned above, analysis of the light fringes 32a-32d and dark fringes 34a-34b can provide useful information. Unfortunately, traditional methods of analyzing fringes can be computationally intensive, expensive, and time consuming.

Figure 4B:
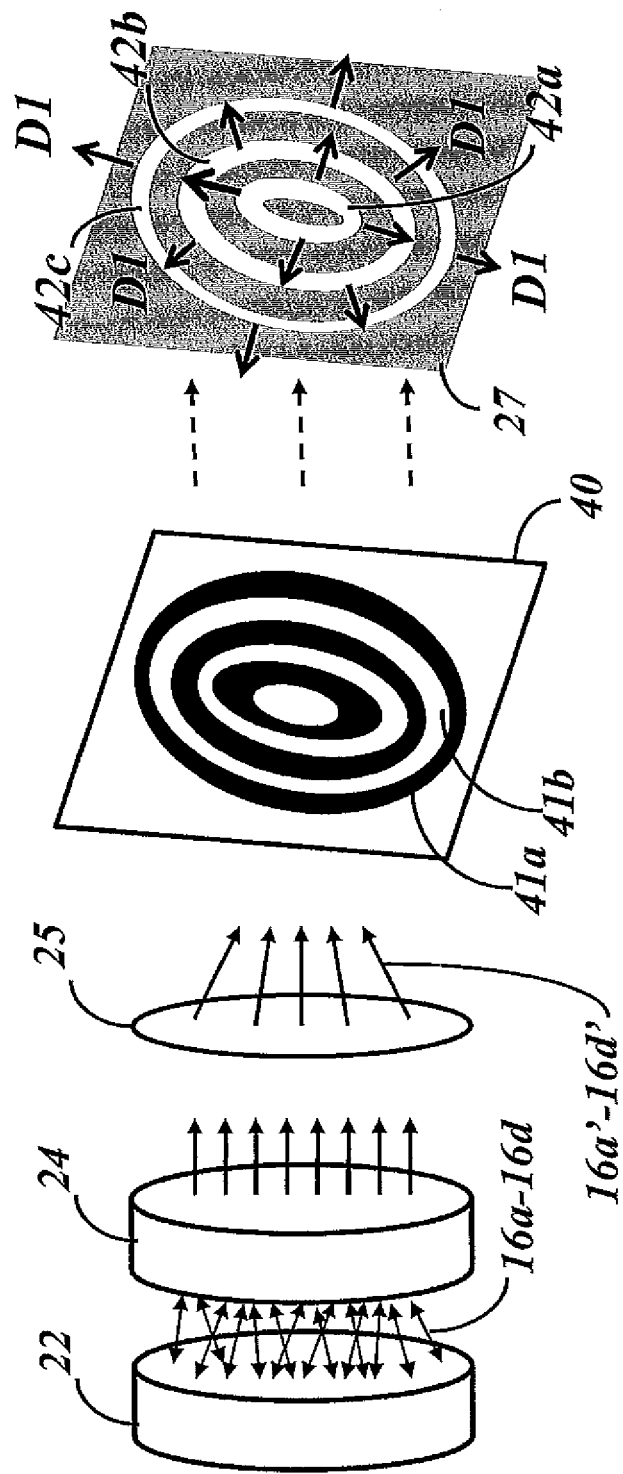
FIG. 4B is a schematic view of a second scenario of a fringe shift measurement system wherein an object is moving away from a light source.
Figure 4C:
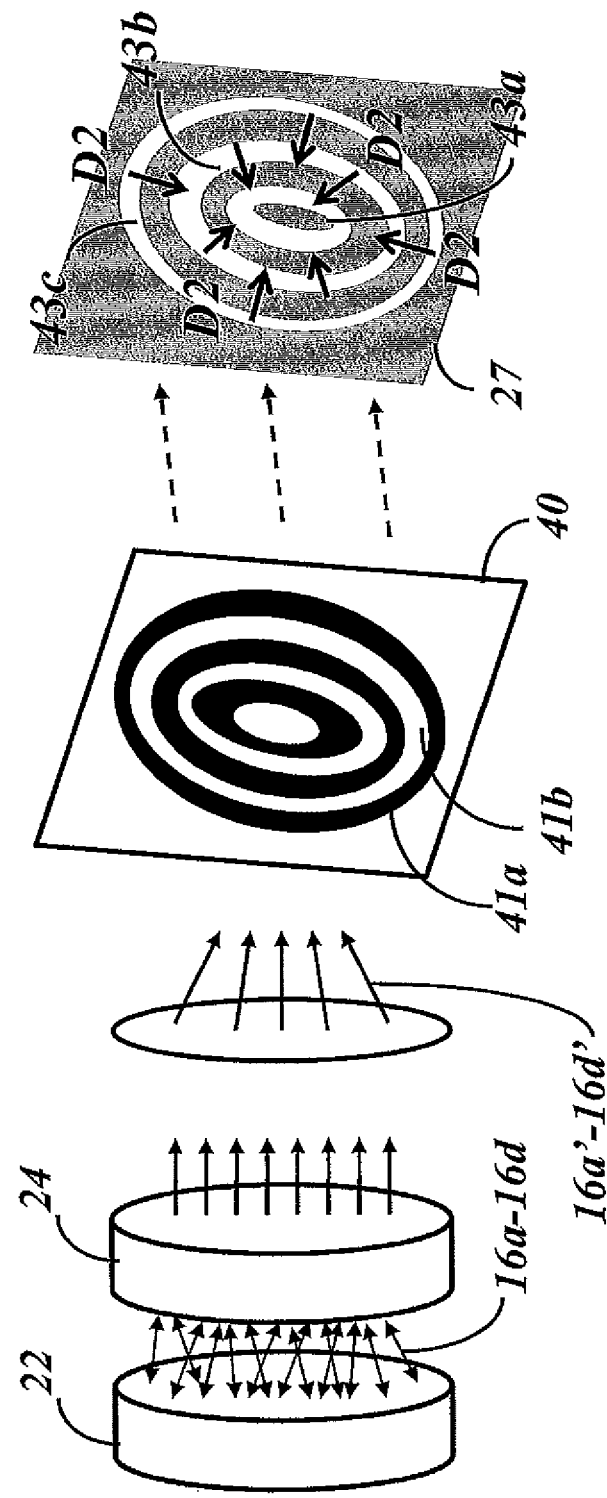
FIG. 4C is a schematic view of a third scenario of a fringe shift measurement system wherein an object is moving toward a light source.

Referring now to FIGS. 4A-4C, a first portion of a fringe shift measurement system is illustrated. The first portion of the fringe shift measurement system introduces an optical mask 40 into the streams of transmitted returns 16a'-16d' exiting the second optical flat 24. Generally, the streams of transmitted returns 16a'-16d' operate to produce images of circular light fringes onto the optical mask 40. The optical mask 40 includes alternating opaque and transparent circular rings 41a and 41b. The opaque circular rings 41a are configured to block passing of the circular fringes of light through the optical mask 40 and the transparent circular rings 41b are configured to allow the circular fringes of light to pass through the optical mask 40. Analysis of the light and dark fringes appearing on the surface 27 can provide useful information about the object 14 as shown in FIG. 1.

Referring now to FIG. 4A, in a first scenario where the object 14 shown in FIG. 1 is stationary relative to the light source 10, the transmitted returns 16a'-16d' focused by the lens 25 onto the mask 40 produce circular light fringes that substantially align with the opaque circular rings 41a. The opaque circular rings 41a of the optical mask 40 block the circular light fringes, thereby resulting in no images (or "intensities") appearing on the surface 27. As shown in FIG. 4A, in this first scenario, the surface 27 is devoid of intensities.

Referring now to FIG. 4B, in a second scenario where the object 14 shown in FIG. 1 is moving away from the light source 10 at a continuously increasing velocity, then the transmitted returns 16a'-16d' produce a plurality of circular light fringes that have continuously expanding diameters as the object 14 continues to move away from the light source 10 at the continuously increasing velocity. In this scenario, the continuously expanding diameters of the circular light fringes projected onto the mask 40 alternate between being blocked by the successive opaque circular rings 41a and passing through successive transparent circular rings 41b. The portions of the circular light fringes passing through the optical mask 40 form a plurality of intensities 42a-42c that can be displayed on the surface 27. In operation, as the object 14 continues to move away from the light source 10 at the continuously increasing velocity, the diameters of the intensities 42a-42c continue to expand in radial directions as represented by the direction arrows D1. The diameters of the intensities 42a-42c can be easily measured and analyzed to determine the velocity at which the object 14 is moving away from the light source 10.

Referring now to FIG. 4C, in a third scenario where the object 14 shown in FIG. 1 is moving toward the light source 10 at a continuously decreasing velocity, then the transmitted returns 16a'-16d' produce circular light fringes that have continuously decreasing diameters as the object 14 continues to move toward the light source 10 at the continuously decreasing velocity. In this scenario the continuously decreasing diameters of the circular light fringes projected onto the mask 40 alternate between being blocked by the successive opaque circular rings 41a and passing through successive transparent circular rings 41b. The portions of the circular light fringes passing through the optical mask 40 form a plurality of intensities 43a-43c that can be displayed on the surface 27. As the object 14 continues to move toward the light source 10 at the continuously decreasing velocity, the diameters of the intensities 43a-43c continue to decrease in radial directions as represented by the direction arrows D2. The speed at which the diameters of the intensities 43a-43c decrease can be easily measured and analyzed to determine the deceleration at which the object 14 is moving toward the light source 10.

Referring again to FIG. 4B and stated in another way, the diameter of each of the intensities 42a-42c corresponds to a single frequency, and therefore to a single speed. The intensities 42a-42c are stationary, that is not moving as illustrated on the surface 27, when they reflect off an object moving at a constant speed. This can be thought of as similar to the action of a speedometer needle, which is stationary as the vehicle moves at a constant speed. If the object moves faster, then the intensities 42a-42c expand to new diameters and if the object moves slower, then the intensities 42a-42c shrink to new diameters.

Stated still another way, the optical mask 40 can be designed to block the imaged circular fringes of light which correspond to one given frequency, and to pass the imaged circular fringes of light which correspond to a different frequency. By measuring the intensity of the circular fringes of light of a given frequency which pass through the optical mask 40, and comparing those measurements to that of light of different frequencies which passes through the optical mask 40, the magnitude of the frequency shift of the light between the first and second measurements can be determined. This will not, however, enable the determination of the direction of the frequency shift.

Referring again to FIGS. 4A-4C and as discussed above, the optical mask 40 converts the fringe positions into a plurality of circular intensities. For those portions of the fringes which have a transmission that is proportional to the intensity of the fringes and which have the same ring pattern as the fringes, then the light which was transmitted by the optical mask 40 would reach a maximum when the center of each fringe is coincident with the transmissive center of each transmissive part of the optical mask 40. When the interfering beams in the interferometer change their phase relationship, or the light being analyzed changes its frequency, the fringe's intensity pattern will shift across the optical mask 40, and will move away from the areas on the mask of maximum transmission, and therefore the light which is passed by the optical mask 40 will decrease in intensity.

Figure 5A:
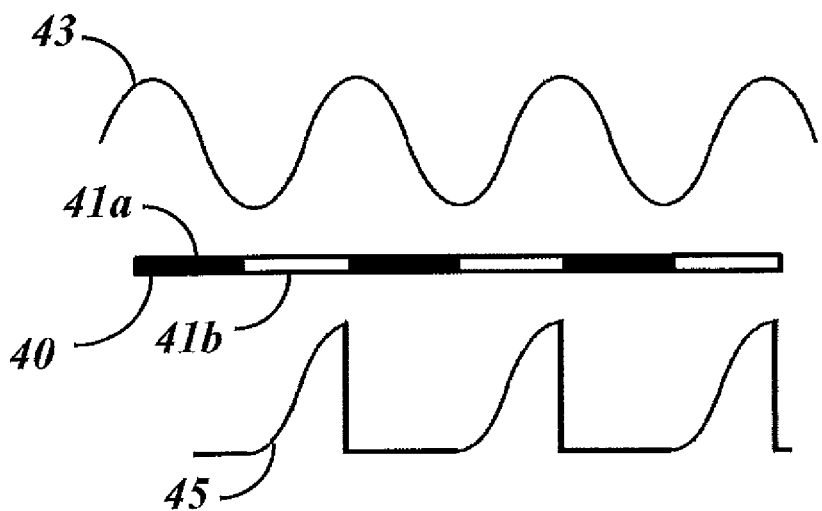
FIG. 5A is a schematic view of a first example of the mask of FIG. 4 blocking portions of fringes and allowing other portions of fringes to pass through the mask.

Referring now to FIG. 5A, the opaque rings 41*a* and the transparent rings 41*b* forming the optical mask 40 are illustrated. Portions of a first wave form 43 having circular fringes of light are shown before passing through the optical mask 40. Portions of a second wave form 45 are shown after passing through the optical mask 40. The amount of the first wave form 43 passing through the optical mask 40 is partially a function of the location of the peaks of the wave form relative to the opaque rings 41*a* and the transparent rings 41*b*. As shown in FIG. 5A, only partial portions of the first wave form 43 pass through the optical mask 40 and form the second wave form 45.

Figure 5B:
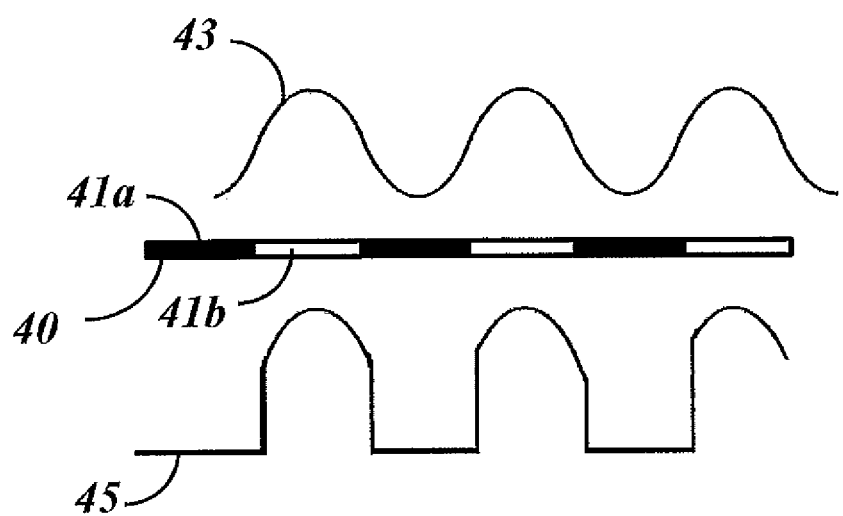
FIG. 5B is a schematic view of a second example of the mask of FIG. 4 blocking portions of fringes and allowing other portions of fringes to pass through the mask.

In another example as shown in FIG. 5B, the opaque rings 41*a* and the transparent rings 41*b* forming the optical mask 40 are illustrated. Portions of a first wave form 43 having circular fringes of light are shown before passing through the optical mask 40. Portions of a second wave form 45 are shown after passing through the optical mask 40. In this example, the peaks of the first wave form 43 coincide with the transparent rings 41*b*, thereby allowing a maximum portion of the first wave form 43 to pass through the optical mask 40 and form the second wave form 45.

Figure 5C:
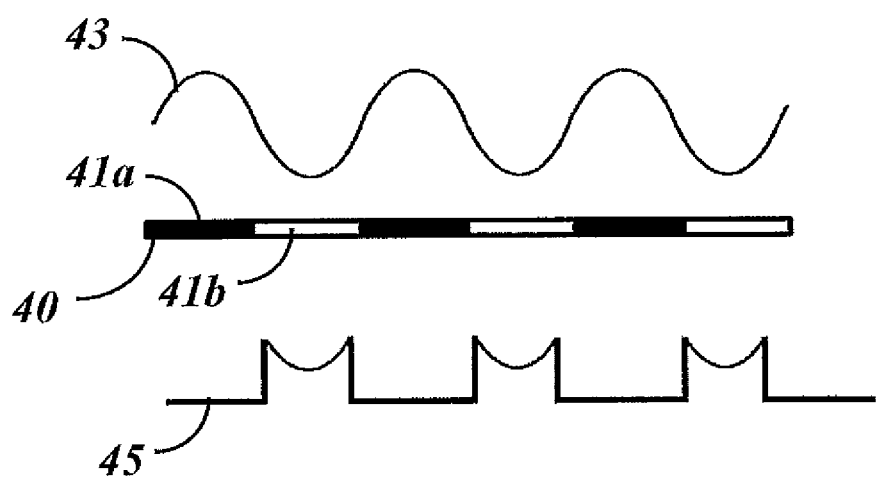
FIG. 5C is a schematic view of a third example of the mask of FIG. 4 blocking portions of fringes and allowing other portions of fringes to pass through the mask.

In a final example as shown in FIG. 5C, the opaque rings 41*a* and the transparent rings 41*b* forming the optical mask 40 are illustrated. Portions of a first wave form 43 having circular fringes of light are shown before passing through the optical mask 40. Portions of a second wave form 45 are shown after passing through the optical mask 40. In this example, the valleys of the first wave form 43 coincide with the transparent rings 41*b*, thereby allowing a minimum portion of the first wave form 43 to pass through the optical mask 40 and form the second wave form 45.

Figure 6:
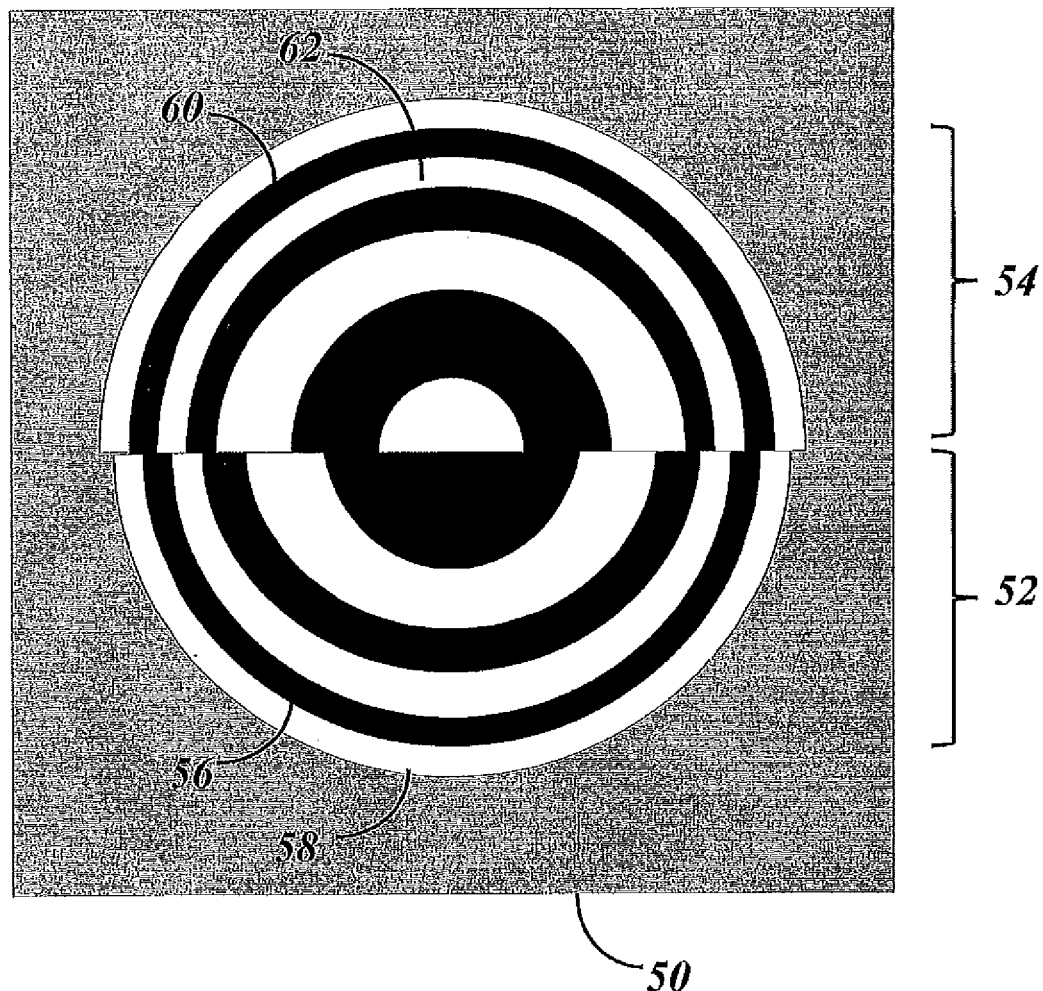
FIG. 6 is a schematic view of a second portion of a fringe shift measurement system wherein the mask of FIG. 4 has been altered to form an optical phase mask.

Referring now to FIG. 6, an optical mask can be formed to have a zero phase portion and a phase-shifted portion. The zero phase portion can have a plurality of mask rings and the phase-shifted portion can have a plurality of mask rings. The mask rings of the zero phase portion are formed by matching the radii of the mask rings with the radii of the fringes at some arbitrary point in their cycle. The mask rings of the phase-shifted portion are formed by matching the radii of the mask rings with the radii of the fringes when the fringes have cycled through 90 degrees of phase. In certain embodiments, the positions of the mask rings can be determined after the fringe shift measurement system is built. In other embodiments, the positions of the mask rings can also be calculated provided the designer knows the wavelength of light, the separation of the optical flats, the index of refraction of the material between the optical flats, and the focal length of the lens used to focus the fringes onto a focal plane.

Referring again to FIG. 6, a second portion of the fringe shift measurement system is illustrated. The optical mask 40 shown in FIG. 4 has been altered to form an optical phase mask 50. The optical phase mask 50 includes a first half 52 and a second half 54. The first half 52 includes opaque rings 56 and transparent rings 58. Similarly the second half 54 includes opaque rings 60 and transparent rings 62. As shown in FIG. 6, the diameters of the opaque rings 56 and 60 and the transparent rings 58 and 62 of the two halves 52 and 54 have been shifted radially with respect to each other, for example, by ninety phase degrees with a full cycle being the distance between successive concentric fringes.

Referring again to FIG. 6, the first and second halves 52 and 54 are configured to gate the transmitted returns exiting the second optical flat 24 into separate phases, which can then be used to determine the direction of the diametral shift of the analyzed fringes using known analytical processes such as for example quadrature.

In practice, the circular pattern of fringes can be shifted by many causes. The light source can shift in frequency, and the system can be used as part of a doppler lidar system, in which the source light reflects or scatters from a solid, gas, or liquid object, and the returned light is then analyzed for frequency shifts to determine the motion of the object. Additionally, the fringes can shift due to changes in the light source's frequency and with thermal, mechanical, and index of refraction changes in the interferometer components.

While the embodiment of the optical phase mask 50 shown in FIG. 6 illustrates opaque rings 56 and 60 having well defined edges with the transparent rings 58 and 62, it is within the contemplation of this invention that the opaque rings 56 and 60 could have edges that are less well defined. That is, the edges of the opaque rings 58 and 62 could be blurred, such as to allow a variable level of the intensities to pass through. The width of the blurred edges and the amount of the intensity allowed to pass through the blurred edges are variables that can be adjusted to improve the desired level of sensitivity of the instrument.

While the optical phase mask 50 illustrated in FIG. 6 is shown as having generally circular opaque rings 56 and 60 and transparent rings 58 and 62, it is contemplated that in other embodiments, the fringes to be analyzed are not circular. The fringes could have any desired shape, including linear shapes or even shapes having arbitrary forms. In these embodiments, the optical phase mask would be formed having opaque and transparent portions that substantially match the shape of the fringes. Consistent with the optical phase mask 50 illustrated in FIG. 6, the optical phase mask having the non-circular opaque and transparent portions would still have two halves, with the two halves shifted radially with respect to each other, for example, by ninety phase degrees with a full cycle being the distance between successive concentric fringes.

Referring again to FIG. 6, the opaque rings 56 and 60 are configured to block the passing of the fringes of light through the optical phase mask 50. It is further contemplated that in other embodiments, the opacity of the opaque rings 56 and 60 can be varied from a complete blockage of the fringes of light to some desired level of transparency. Varying the levels of the opacity of the opaque rings advantageously can allow improvement in the resolution of desired analytical determinations, such as the non-limiting example of velocity measurements of the object 14 shown in FIG. 1. It is also contemplated that the various opaque rings can each have different levels of opacity.

Figure 7:
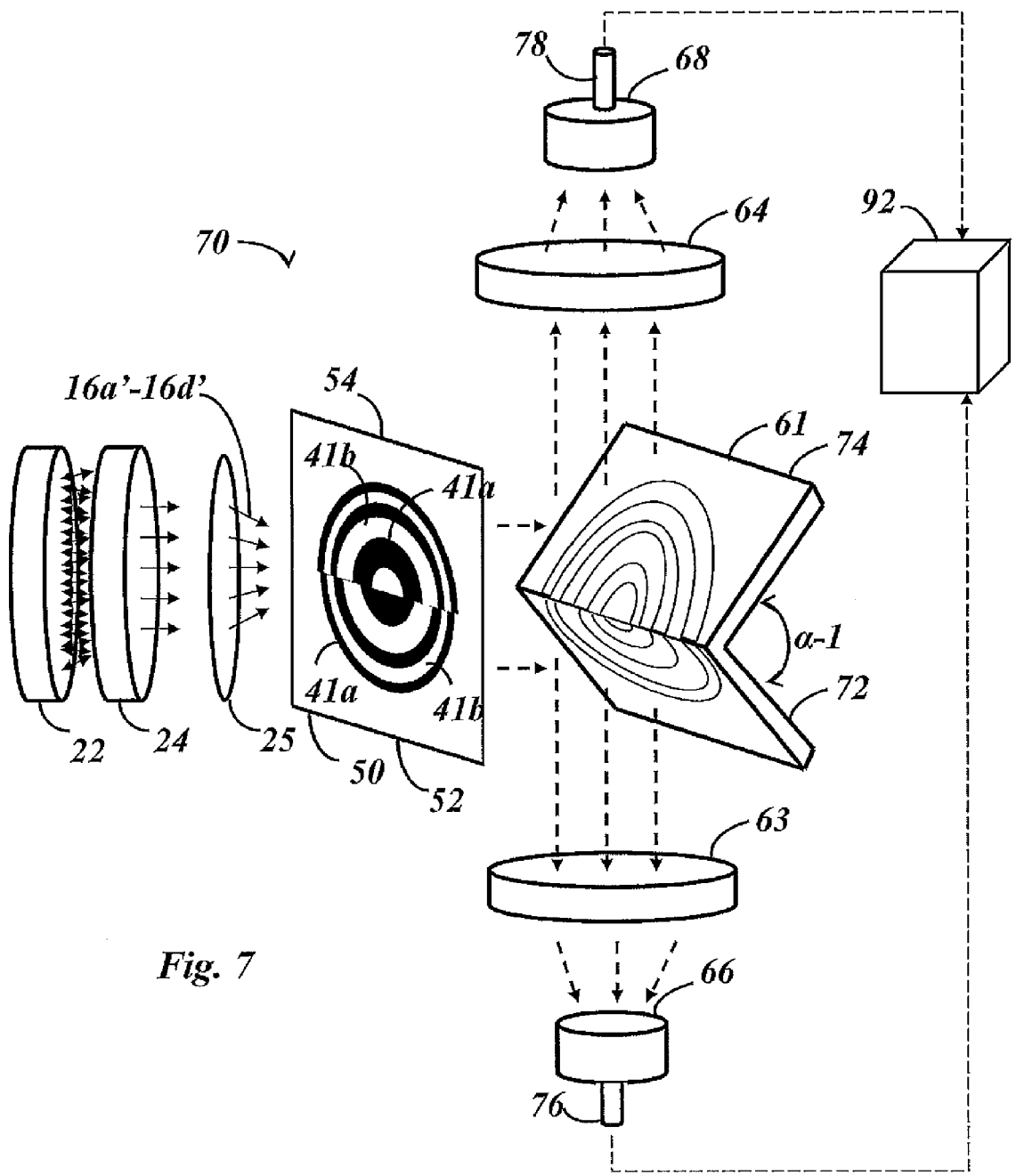
FIG. 7 is a schematic view of the complete fringe shift measurement system.

Referring now to FIG. 7, the fringe shift measurement system is illustrated at 70. The fringe shift measurement system 70 includes the optical phase mask 50, a splitter 61, first and second concentrators 63 and 64 and first and second detectors 66 and 68.

Referring again to FIG. 7, the splitter 61 has a first segment 72 and a second segment 74. The first and second segments 72 and 74 are configured to direct incoming intensities from the optical phase mask 50 to directions toward the respective first and second concentrators 63 and 64. In the illustrated embodiment, each of the first and second segments 72 and 74 have a mirrored surface. However, in other embodiments, each of the first and second segments 72 and 74 can have other surface finishes sufficient to direct incoming intensities from the mask 50 to directions toward the respective first and second concentrators 63 and 64. The first and second segments 72 and 74 form an angle $\alpha$-1 with each other. In the illustrated embodiment, the angle $\alpha$-1 is in a range of from about 20° to about 70°. In other embodiments, the angle $\alpha$-1 can be less than about 20° or more than about 70°.

Referring again to FIG. 7, the first and second concentrators 63 and 64 are configured to receive the intensities directed by the first and second segments 72 and 74 of the splitter 61. The first concentrator 63 is further configured to focus the received fringes into the first detector 66. Similarly, the second concentrator 64 is further configured to focus the received fringes into the second detector 68. In the illustrated embodiment, the first and second concentrators 63 and 64 are optical lens having a desired focal point. Alternatively, the first and second concentrators 63 and 64 can be any desired structure, device, mechanism or combination thereof sufficient to focus the received intensities into the first and second detectors 66 and 68.

Referring again to FIG. 7, the first and second detectors 66 and 68 are configured for several functions. First, the first and second detectors 66 and 68 are configured to receive the intensities focused by the first and second concentrators 63 and 64 respectively. The first and second detectors 66 and 68 are further configured to convert the received intensities into digital signals that can be easily analyzed. The analysis of the digital signals will be discussed in more detail below. In the illustrated embodiment, the first and second detectors 66 and 68 are single-point detectors. However in other embodiments, the first and second detectors 66 and 68 can be any desired structure, device or mechanism sufficient to receive the intensities focused by the concentrators 63 and 64 and sufficient to convert the received intensities into electronic or digital signals that can be easily analyzed.

Referring again to FIG. 7 and to the scenario in which the object 14 is stationary relative to the light source 10 (described above and shown in FIG. 4A), then the opaque circular rings 41*a* of the first half 52 of the optical mask 50 block the circular light fringes, thereby resulting in no intensities appearing on the first segment 72 of the splitter 61. Accordingly, the first detector 66 does not receive any intensities and in turn generates zero level digital signals. Since the second half 54 of the optical mask 50 is shifted with respect to the perfectly blocking action of the first half 52 of the optical mask 50, then some of the intensities passing through the second half 54 appear on the second segment 74 of the splitter 61. These intensities are, in turn, directed to the second detector 68.

Referring again to FIG. 7 and to either of the scenarios where the object 14 is moving away from or toward the light source 10 (described above and shown in FIGS. 4B and 4C), then the expanding or decreasing fringes pass through the transparent rings 41*b* of the optical mask 50 and form intensities on the splitter 61. The intensities, now at 90° out of phase, are received by the first and second detectors 66 and 68. Accordingly, the first and second detectors 66 and 68 generate digital signals. As discussed above, the generated digital signals can then be used to determine the direction of the diametral shift of the analyzed intensities using known analytical processes such as for example quadrature.

Referring again to FIG. 7, the first and second detectors 66 and 68 are connected to first and second conduits 76 and 78. The first and second conduits 76 and 78 are configured to convey the digital signals to downstream operations, such as for example, a control unit 92. In the illustrated embodiment, the first and second conduits 76 and 78 are optic fibers. In other embodiments, the first and second conduit 76 and 78 can be other devices, structures or mechanisms.

Referring again to FIG. 7, the control unit 92 is configured to compare and analyze the digital signals. In the illustrated embodiment, the control unit 92 is a microprocessor based device. However, in other embodiments, the control unit 92 can be other mechanisms, structures, devices or combinations thereof, sufficient to compare and analyze the digital signals.

In operation, the fringe shift measurement system 70 operates as follows. In a first step, the transmitted returns 16*a'*-16*d'* exit the second optical flat 24 and impart images of circular fringes onto the optical phase mask 50. The first and second halves 52 and 54 of the optical phase mask 50 are shift radially with respect to each other as discussed above. The opaque rings 56 of the first half 52 block fringes and the transparent rings 58 allow fringes to pass through to the first segment 72 of the splitter 61. Similarly, the opaque rings 60 of the second half 54 block fringes and the transparent rings 62 allow fringes to pass through to the second segment 74 of the splitter 61. In a next step, the first segment 72 of the splitter 60 directs the incoming intensities toward the first concentrator 63, which in turn, focuses the incoming intensities to the first detector 66. Simultaneously, the second segment 74 of the splitter 61 directs the incoming intensities toward the second concentrator 64, which in turn, focuses the incoming intensities to the second detector 68. Next, the first and second detectors 66 and 68 generate digital signals for analysis by the control unit 92.

While the embodiment shown in FIG. 7 illustrates use of an optical phase mask 50 have a particular profile for the opaque and transparent rings, it is within the contemplation of this invention that in operation, the optical phase mask 50 can be easily replaced with other optical phase masks having different opaque and transparent ring profiles. The replacement of the optical phase mask with alternate optical phase masks would advantageously allow for the analysis of different gas, water and particle properties.

While the embodiment of the optical phase mask 50 shown in FIG. 7 illustrates the use of a fixed pattern of opaque and transparent rings, it is further contemplated that in other embodiments, the pattern does not need to be fixed. In fact, the pattern could temporary and changeable, such as patterns formed by an electronically-based device, including an LCD.

Figure 8A:
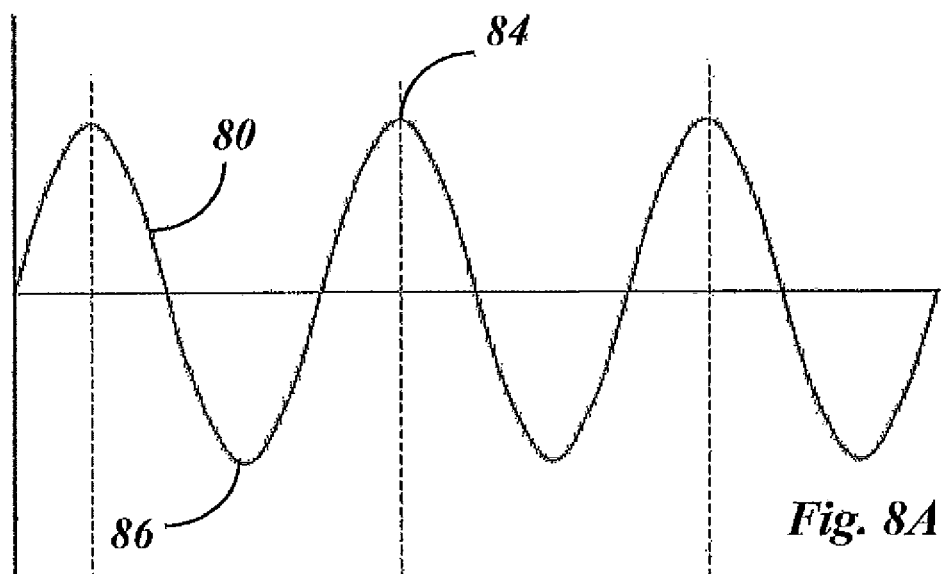
FIG. 8A is a graph illustrating a first set of quadrature signals produced by the optical phase mask of FIG. 7.

Referring now to FIG. 8A, one example of the digital output signal 80 provided by the first detector 66 is illustrated in a graph format. The digital output signal 80 includes a high state 84 and a low state 86.

Figure 8B:
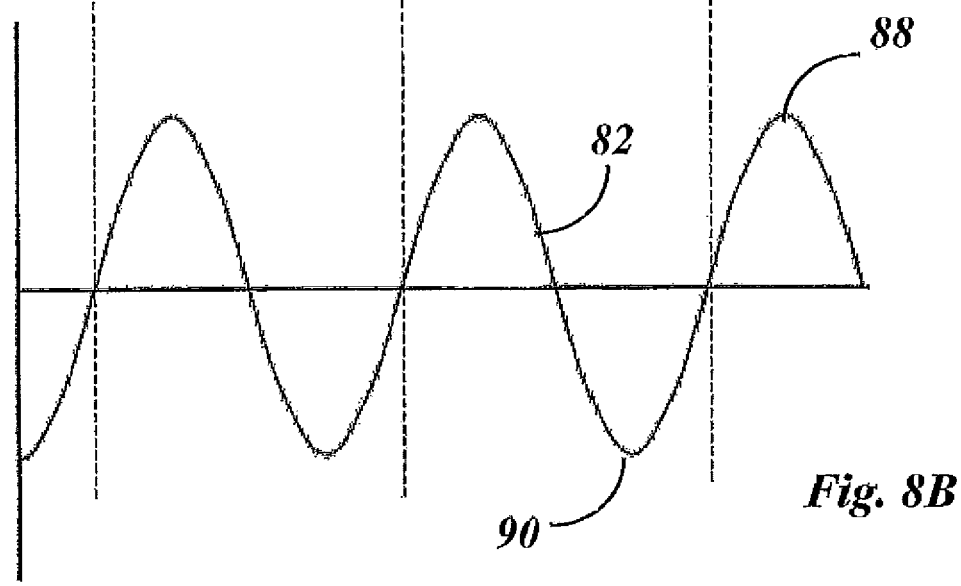
FIG. 8B is a graph illustrating a second set of quadrature signals produced by the optical phase mask of FIG. 7.

Referring now to FIG. 8B, one example of the digital output signal 82 provided by the second detector 68 is illustrated in a graph format. The digital output signal 82 includes a high state 88 and a low state 90.

As shown in FIGS. 8A and 8B, the phases of the first and second digital output signals 80 and 82 are different from each other, by a phase of about 90°. While the digital output signals 80 and 82 illustrated in FIGS. 8A and 8B have a generally sinusoidal shape, it should be appreciated that in other embodiments, the digital output signals 80 and 82 can have other shapes and can be out of phase from each other by more or less than about 90°.

The magnitude and direction of frequency shifts of the fringes can be determined by comparing the digital output signals 80 and 82 provided by the first and second single-point detectors 66 and 68. The analysis of the digital output signals 80 and 82 can advantageously be accomplished much faster than integrating and analyzing the outputs of traditional multi-pixel detectors. In addition, the digital output signals 80 and 82 provided by the first and second single point detectors 66 and 68 have a higher signal-to-noise ratio and therefore a higher detectability than traditional multi-pixel detectors.

The fringe shift measurement system 70 advantageously provides many benefits, although all of the benefits may not be present in all embodiments. First, the fringe shift measurement system provides a simple and economical method of analyzing fringe information produced by an interferometer. Second, the fringe shift measurement system 70 advantageously improves the speed with which fringe information from an interferometer can be analyzed. Third, the fringe shift measurement system 70 provides a system for monitoring and analyzing fringe information using a single point detector or detectors. Finally, the fringe shift measurement system 70 provides a system which is efficient in its employment of fringe energy during the analysis of the information contained therein.

While the embodiment of the fringe shift measurement system 70 shown in FIG. 7 illustrates the use of a single conduit configured to convey the collected returns from a single light source to the first and second flats 22 and 24, it should be appreciated that in other embodiments, more than one conduit can be used to convey the collected returns from multiple light sources.

Figure 9:
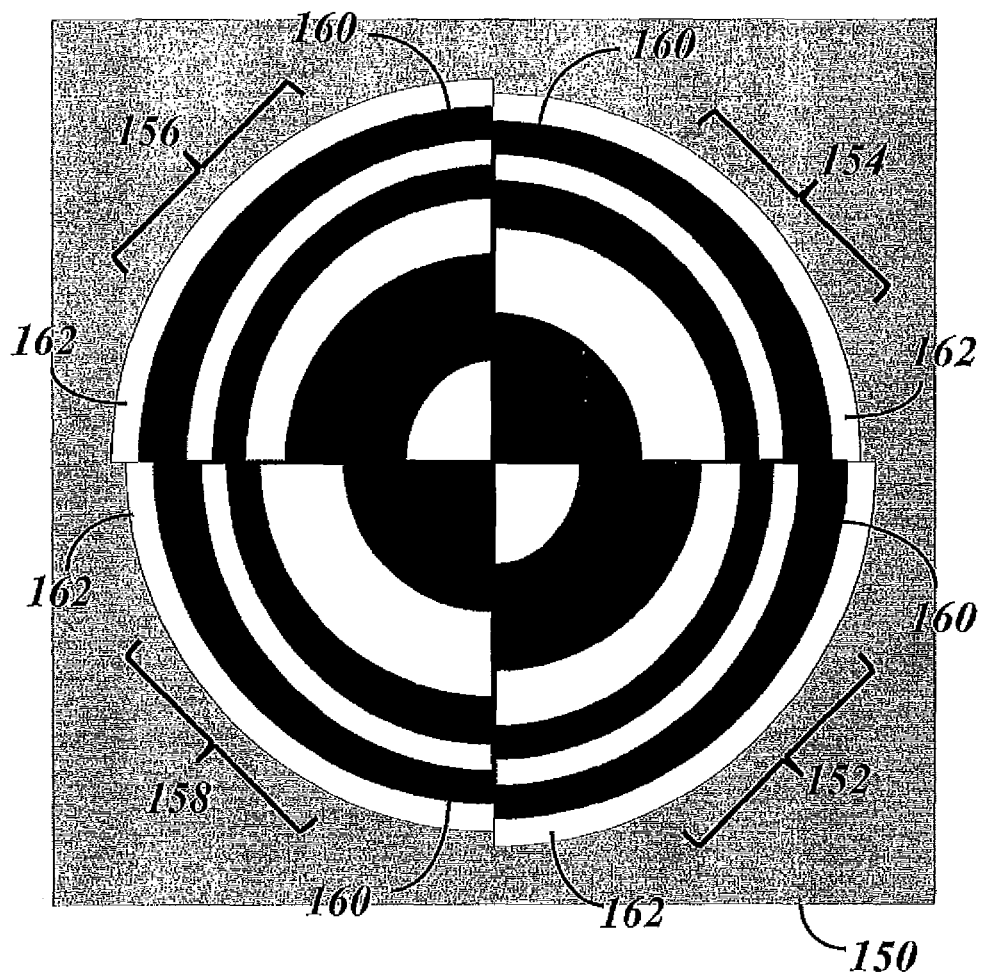
FIG. 9 is an alternate embodiment of an optical phase mask having four quadrants.

Referring now to FIG. 9, a second embodiment of an optical mask is shown generally at 150. The optical mask 150 has four quadrants 152, 154, 156 and 158. The quadrants 152, 154, 156 and 158 are formed such as to be phase-shifted from each other in a similar manner as the first half 52 and a second half 54 of the optical mask 50 illustrated in FIG. 6 and described above.

Referring again to FIG. 9, each of the quadrants 152, 154, 156 and 158 includes a plurality of opaque rings 160 and a plurality of transparent rings 162. As discussed above, the diameters of the opaque rings 160 and the transparent rings 162 of adjacent quadrants have been shifted radially with respect to each other, for example, by ninety phase degrees with a full cycle being the distance between successive concentric fringes.

Figure 10A:
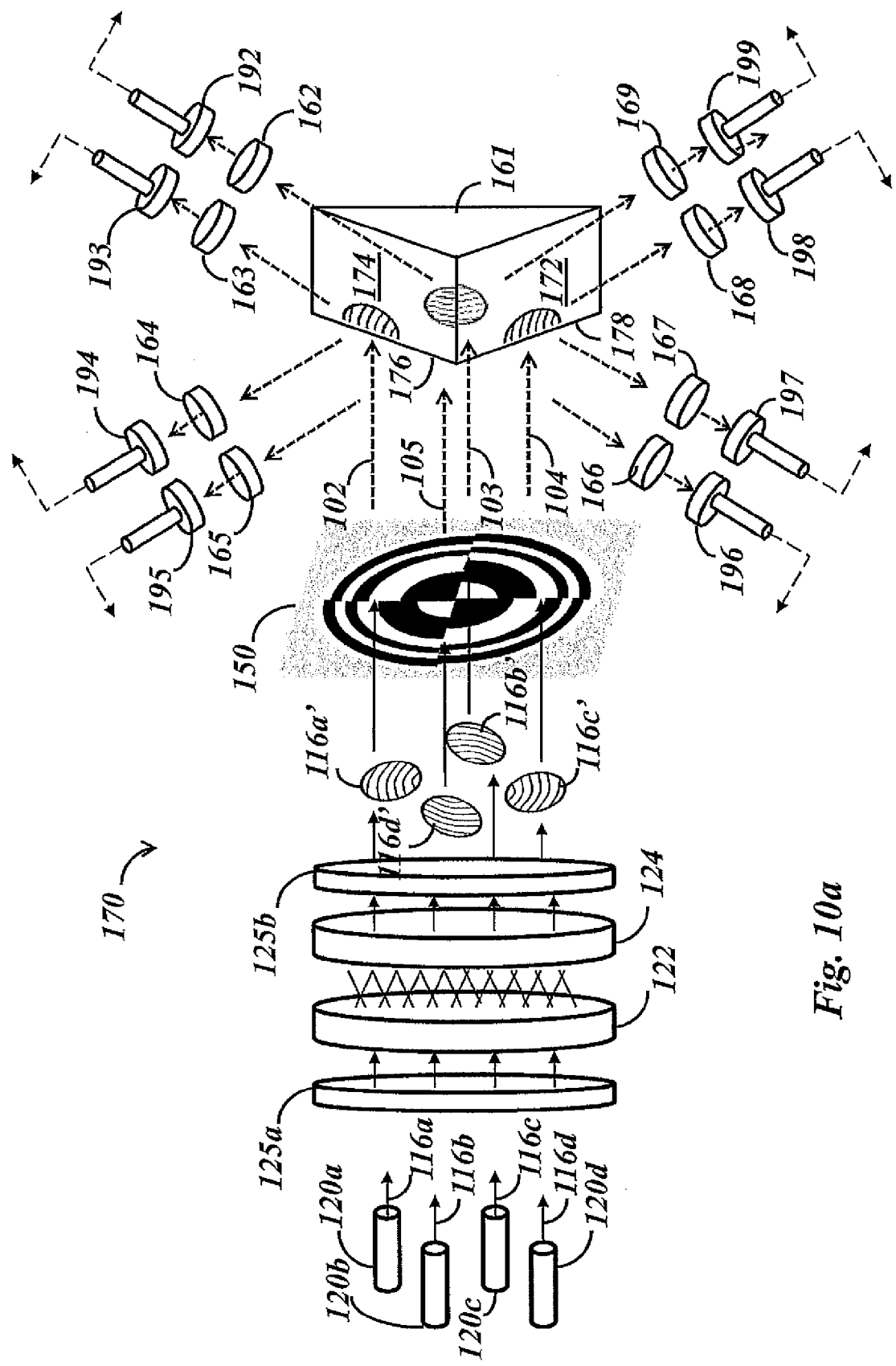
FIG. 10a is a schematic view of an alternate fringe shift measurement system employing the optical phase mask of FIG. 9.

Referring now to FIG. 10a, a second embodiment of a fringe shift measurement system is illustrated at 170. The embodiment differs from the fringe shift measurement system 70 illustrated in FIG. 7 in that reflected returns from multiple light sources are incorporated. The advantages of incorporating the reflected returns from multiple light sources will be discussed below. The fringe shift measurement system 170 includes a plurality of conduits 120a-120d, first and second optical flats 122 and 124, first and second lens 125a and 125b, the optical phase mask 150, a splitter 161, a plurality of concentrators 162-169 and a plurality of detectors 192-199.

In the embodiment illustrated in FIG. 10a, each of the conduits 120a-120d is the same as, or similar to the conduit 20 shown in FIG. 2 and described above. Alternatively, the conduits 120a-120d can be different than the conduit 20. Conduit 120a is associated with a light source and configured to convey reflected returns 116a from that light source to the first lens 125a. Similarly, conduit 120b is associated with a light source and configured to convey reflected returns 116b from that light source to the first lens 125a, conduit 120c is associated with a light source and configured to convey reflected returns 116c from that light source to the first lens 125a and conduit 120d is associated with a light source and configured to convey reflected returns 116d from that light source to the first lens 125a. While the embodiment illustrated in FIG. 10a shows a quantity of four conduits 120a-120d, each associated with its own dedicated light source, it should be appreciated that in other embodiments any desired quantity of conduits can be used, with each conduit associated with a dedicated light source.

In the embodiment illustrated in FIG. 10a, the first and second lens 125a and 125b are the same as, or similar to the lens 25 shown in FIG. 2 and described above. However, in other embodiments, the first and second lens 125a and 125b can be different than the lens 25. The first lens 125a is configured to collimate the reflected returns 116a-116d such that they can be individually focused onto portions of the optical phase mask 150.

In the embodiment illustrated in FIG. 10a, the first and second optical flats 122 and 124 are the same as, or similar to the first and second optical flats 22 and 24 shown in FIG. 2 and described above. However, in other embodiments, the first and second optical flats 122 and 124 can be different than the first and second optical flats 22 and 24. The optical flats 122 and 124 are configured to facilitate reflections of the returns 116a-116d between their inner surfaces while allowing portions of the returns to be transmitted through the second optical flat 124. While the embodiment shown in FIG. 10a illustrates the optical flats 122 and 124 as having substantially flat inner and outer surfaces, it should be appreciated that in other embodiments, the inner and outer surfaces of the optical flats 122 and 124 can have any desired shape sufficient to facilitate reflections of the returns 116a-116d between their inner surfaces while allowing portions of the returns to be transmitted through the second optical flat 124. The reflected returns passing through the second optical flat 124 form transmitted returns 116a'-116d'.

Figure 10B:
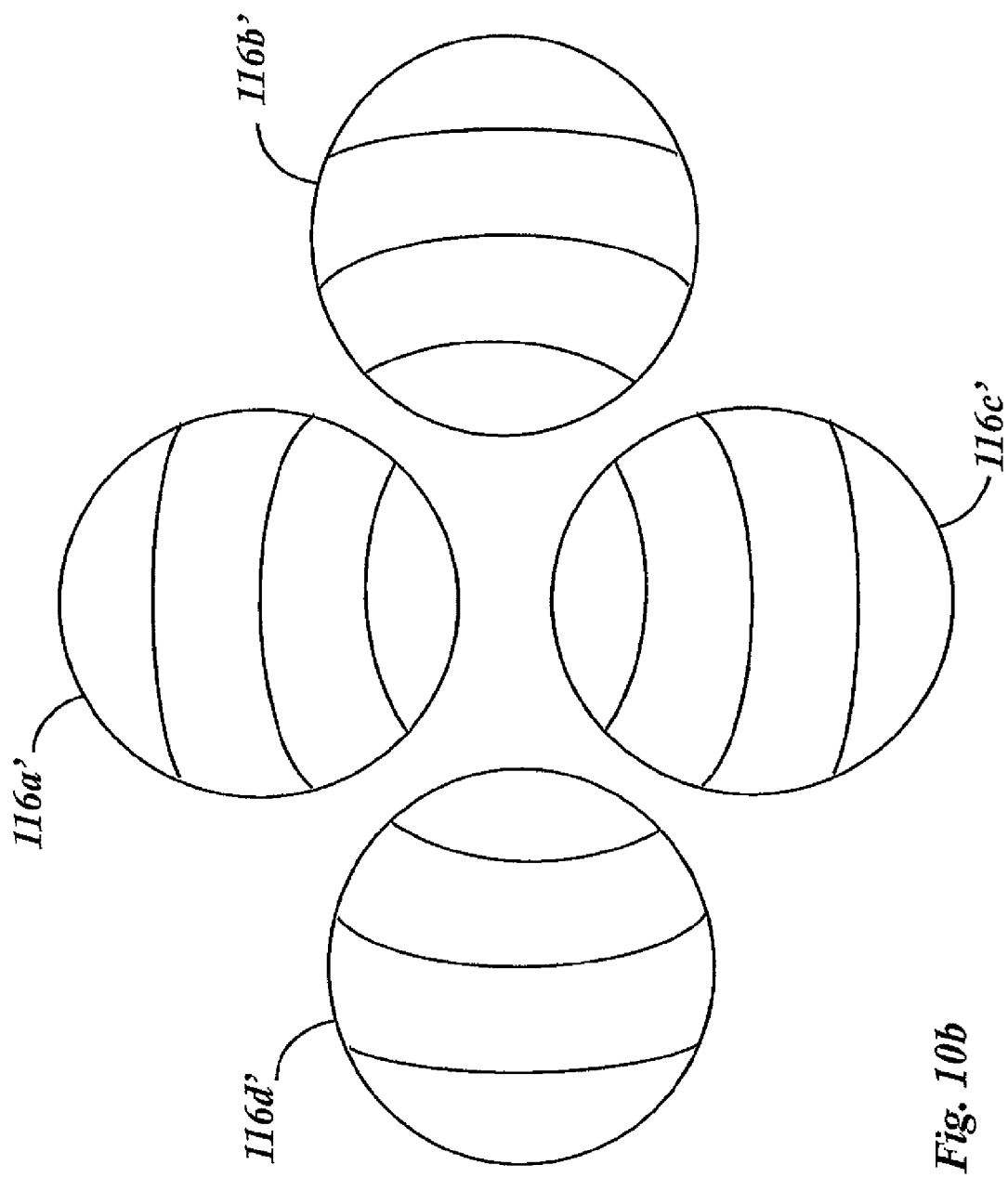

Referring now to FIG. 10b, the transmitted returns 116a'-116d' are illustrated. Each of the transmitted returns 116a'-116d' are shifted relative to each other because the object is moving at different vector velocities relative to each of the lights sources.

Referring again to FIG. 10a, the mask 150 is illustrated. The mask 150 includes quadrants 152, 154, 156 and 158 as shown in FIG. 9. Referring again to FIG. 10a, the mask 150 is configured to receive the transmitted returns 116a'-116d' such that transmitted return 116a' falls at the intersection of quadrants 154 and 156, transmitted return 116b' falls at the intersection of quadrants 152 and 154, transmitted return 116c' falls at the intersection of quadrants 152 and 158 and transmitted return 116d' falls at the intersection of quadrants 156 and 158. The intersections between the quadrants 152, 154, 156 and 158 are configured to gate the transmitted returns 116a'-116d' exiting the second optical flat 24 into distinct phases, which can then be used to determine directions using known analytical processes such as for example quadrature.

Figure 11:
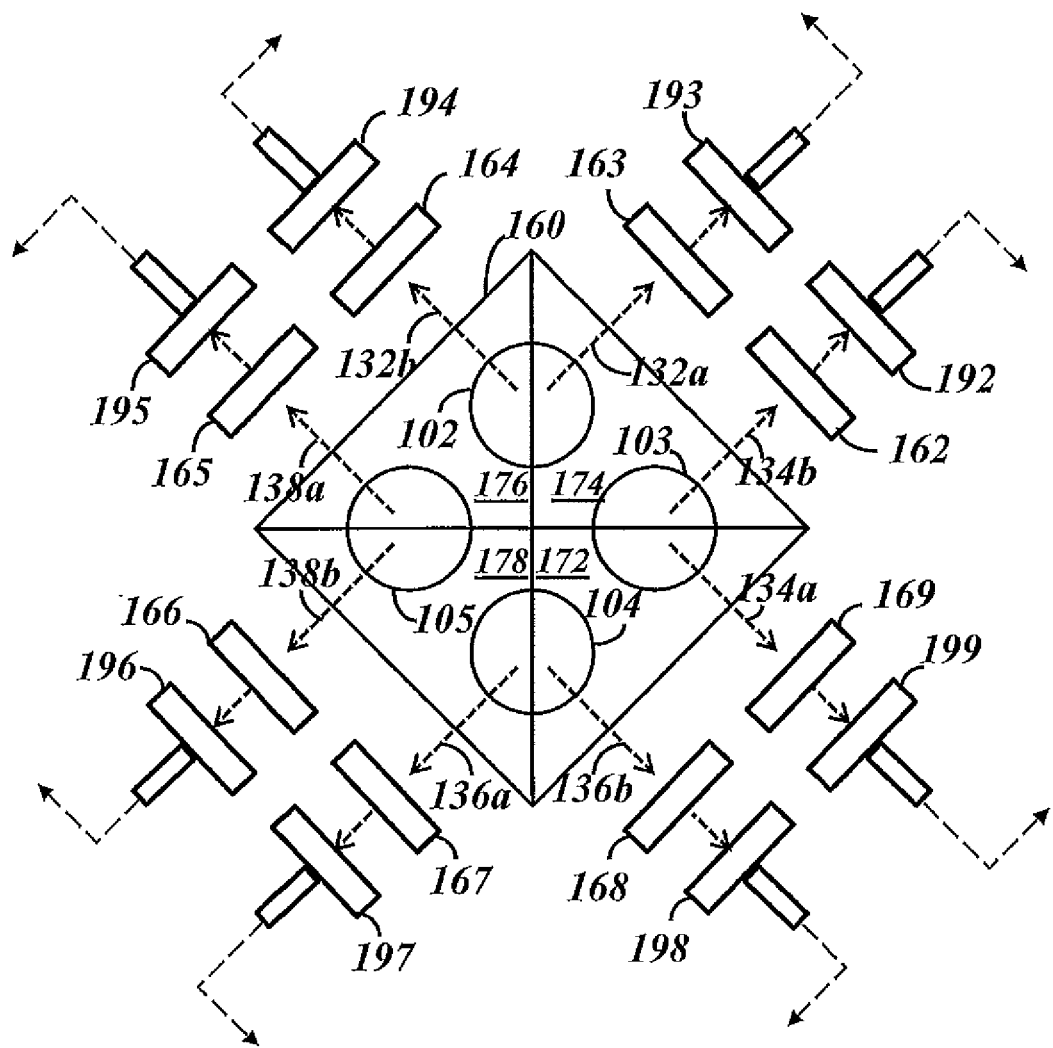
FIG. 11 is a front view of the splitter shown in FIG. 10a illustrating the direction of the various intensities.

Referring now to FIGS. 10a and 11, the splitter 161 has a first surface 172, a second surface 174, a third surface 176 and a fourth surface 178. The surfaces 172, 174, 176 and 178 are configured to direct portions of the incoming intensities from the mask 150 to the plurality of concentrators 162-169. For example, the transmitted return 116a' exits the mask 150 as intensity 102. As shown in FIG. 11, a first portion 132a of intensity 102 projects onto the second surface 174 of the splitter 161 and is directed to concentrator 163. A second portion 132b of the intensity 102 is projected onto the third surface 176 of the splitter 161 and is directed to concentrator 164. In a similar manner, transmitted return 116b' exits the mask 150 as intensity 103. A first portion 134a of intensity 103 projects onto the first surface 172 of the splitter 161 and is directed to concentrator 169. A second portion 134b of the intensity 103 is projected onto the second surface 174 of the splitter 161 and is directed to concentrator 162. Transmitted return 116c' exits the mask 150 as intensity 104. A first portion 136a of intensity 104 projects onto the fourth surface 178 of the splitter 161 and is directed to concentrator 167. A second portion 136b of the intensity 104 is projected onto the first surface 172 of the splitter 161 and is directed to concentrator 168. Finally, transmitted return 116d' exits the mask 150 as intensity 105. A first portion 138a of intensity 105 projects onto the third surface 176 of the splitter 161 and is directed to concentrator 165. A second portion 138b of the intensity 105 is projected onto the fourth surface 178 of the splitter 161 and is directed to concentrator 166.

In the embodiment illustrated in FIG. 10a, each of the surfaces 172, 174, 176 and 178 have a mirrored finish. However, in other embodiments, each of the surfaces 172, 174, 176 and 178 can have other finishes sufficient to direct incoming intensities from the mask 150 to the respective concentrators 162-169.

In the embodiment illustrated in FIGS. 10a and 11, the concentrators 162-169 and the detectors 192-199 are the same as, or similar to, the concentrators 62 and 64 and the detectors 66 and 68 shown in FIG. 7 and described above. However, it should be understood that the concentrators 162-169 and the detectors 192-199 can be different than the concentrators 62 and 64 and the detectors 66 and 68.

As discussed above, the detectors 192-199 are configured to receive the intensities focused by the concentrators 162-199 and are further configured to convert the received intensities into digital signals. The generated digital signals can then be used to determine the direction of the diametral shift of the analyzed intensities using known analytical processes such as for example quadrature.

In operation, the fringe shift measurement system 170 operates as follows. In a first step, reflected returns 116a-116d exit their respective conduits 120a-120d in directions toward the first lens 125. The first lens 125 focuses the reflected returns 116a-116d into the first optical flat 122. The reflected returns 116a-116d pass through the first optical flat 122 and begin reflecting between the first and second optical flats 122 and 124. Certain of the reflected returns 116a pass through the second optical flat 124 and form transmitted returns 116a'. Similarly, certain of the reflected returns 116b-116d pass through the second optical flat 124 and form transmitted returns 116b'-116d'.

Referring again to FIG. 10a, transmitted returns 116a'-116d pass through the various intersections of the quadrants 152, 154, 156 and 158 of the optical phase mask 150, thereby forming intensities 102-105. Portions 132a and 132b of intensity 102 appear on surfaces 174 and 176 of the splitter 161, portions 134a and 134b of intensity 103 appear on surfaces 172 and 174, portions 136a and 136b of intensity 104 appear on surfaces 178 and 172, and portions 138a and 138b of intensity 105 appear on surfaces 176 and 178.

As discussed above, the portions of the intensities 102-105 appearing on the various surfaces of the splitter 161 are directed to the various detectors 192-199. As can be seen by FIG. 10a, the intensities 102-105 of the respective transmitted returns 116a'-116d' are projected on two segments of the splitter 161 and accordingly directed to two detectors. In this manner, each of the intensities can be used to analyze a different direction and at least one of the intensities can be used as a calibration source. It should be understood that the intensities can be calibrated for desired variables, such as the non-limiting examples of temperature and vibration.

Figure 12:
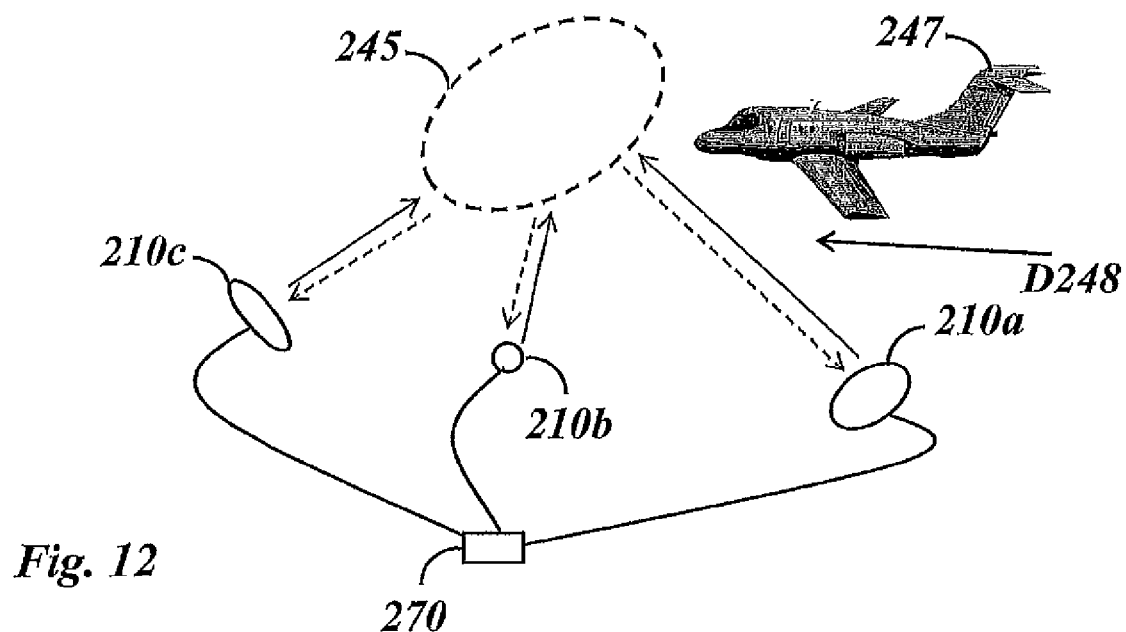
FIG. 12 is a schematic view of a ground-based fringe shift measurement system having multiple light sources and deployed such as to monitor a volume of airspace.

The fringe shift measurement system 170 illustrated in FIG. 10A provides a simple and economical method of analyzing fringe information produced by an interferometer. A first non-limiting example of the application of the fringe shift measurement system 170 is shown in FIG. 12. In this illustration, the ground-based fringe shift measurement system 270 has multiple light sources 210a-210c and is deployed such as to monitor a volume of airspace 245. An airplane 247 is shown traveling in direction D248, thereby eventually passing through the airspace 245. Deployed in this manner, the fringe shift measurement system 270 can measure and monitor characteristics of the airspace 245, such as for example the velocity of the wind shear. In the illustrated embodiment, the fringe shift measurement system 270 incorporates three light sources 210a-210c and a fourth light source (not shown) as a reference. However, it should be appreciated that in other embodiments, any desired number of light sources can be used.

Figure 13:
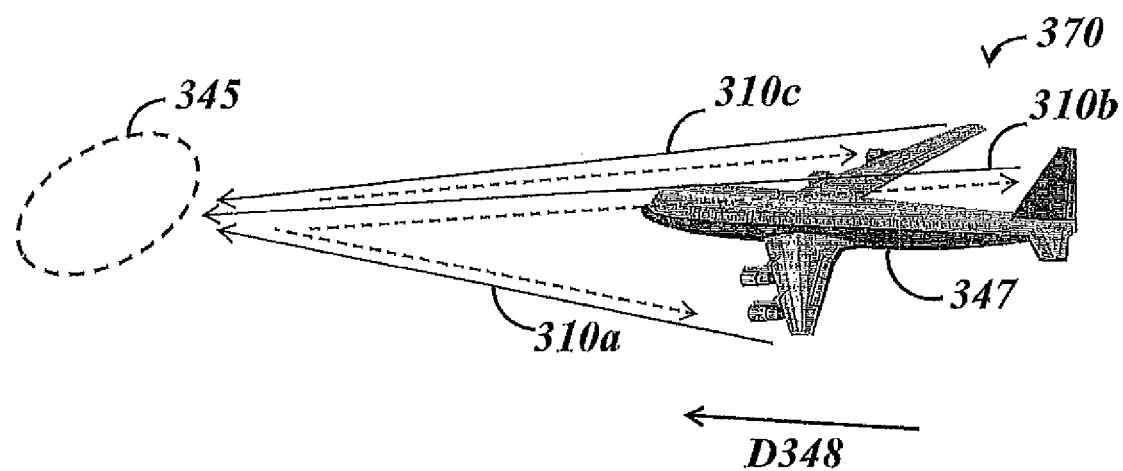
FIG. 13 is a schematic view of an air-based fringe shift measurement system having multiple light sources and deployed such as to monitor a volume of airspace.

A second non-limiting example of the application of the fringe shift measurement system 170 is shown in FIG. 13. In this illustration, an air-borne fringe shift measurement system 370 has multiple light sources 310a-310c and is deployed on an airplane 347 such as to monitor a volume of airspace 345 at some desired point in front of the airplane 347. The airplane 347 is shown traveling in direction D348, thereby eventually passing through the airspace 345. Deployed in this manner, the fringe shift measurement system 370 can measure and monitor the characteristics of the airspace 345, such as for example the velocity and direction of wind in the airspace 345. In the illustrated embodiment, the fringe shift measurement system 270 incorporates three light sources 310a-310c and a fourth light source (not shown) as a reference. However, it should be appreciated that in other embodiments, any desired number of light sources can be used.

While the embodiments illustrated in FIGS. 12 and 13 concern the application of a fringe shift measurement system to analyze a volume of airspace, it should be appreciated that the fringe shift measurement system can be applied to other desired mediums. As one non-limiting example, the fringe shift measurement system can be employed to analyze the characteristics of deep sea water encountered by a submarine.

In still other embodiments, it is within the contemplation of this invention that the transmitted returns, exiting the optical flats, can be scanned across an optical phase mask using any of the known fringe scanning methods. As is known in the art, methods of forming scans include changing the distance between the inner surfaces of the optical flats and changing the characteristics of the environment in which the optical flats operate (for example changing the gas between the inner surfaces of the optical flats, changing the temperature of the gas between the inner surfaces of the optical flats or changing the pressure of the gas between the inner surfaces of the optical flats). Scanning the transmitted returns across the optical phase mask broadens the usefulness of the fringe shift measurement system by providing information of the Doppler line broadening of the resulting intensities. Information of the Doppler line broadening can be used to analyze fine details of the reflecting object, such as the non-limiting examples of the molecular and dust composition of the reflecting object. In this embodiment, intensity differences between the transmitted returns and the reference return would indicate the transmitted returns had been Doppler broadened, or that there was a strong particulate component. Advantageously, the process of scanning in conjunction with the use of the optical phase mask, provides that the data of the resulting intensities can be extracted faster with far fewer calculations.

Figure 14:
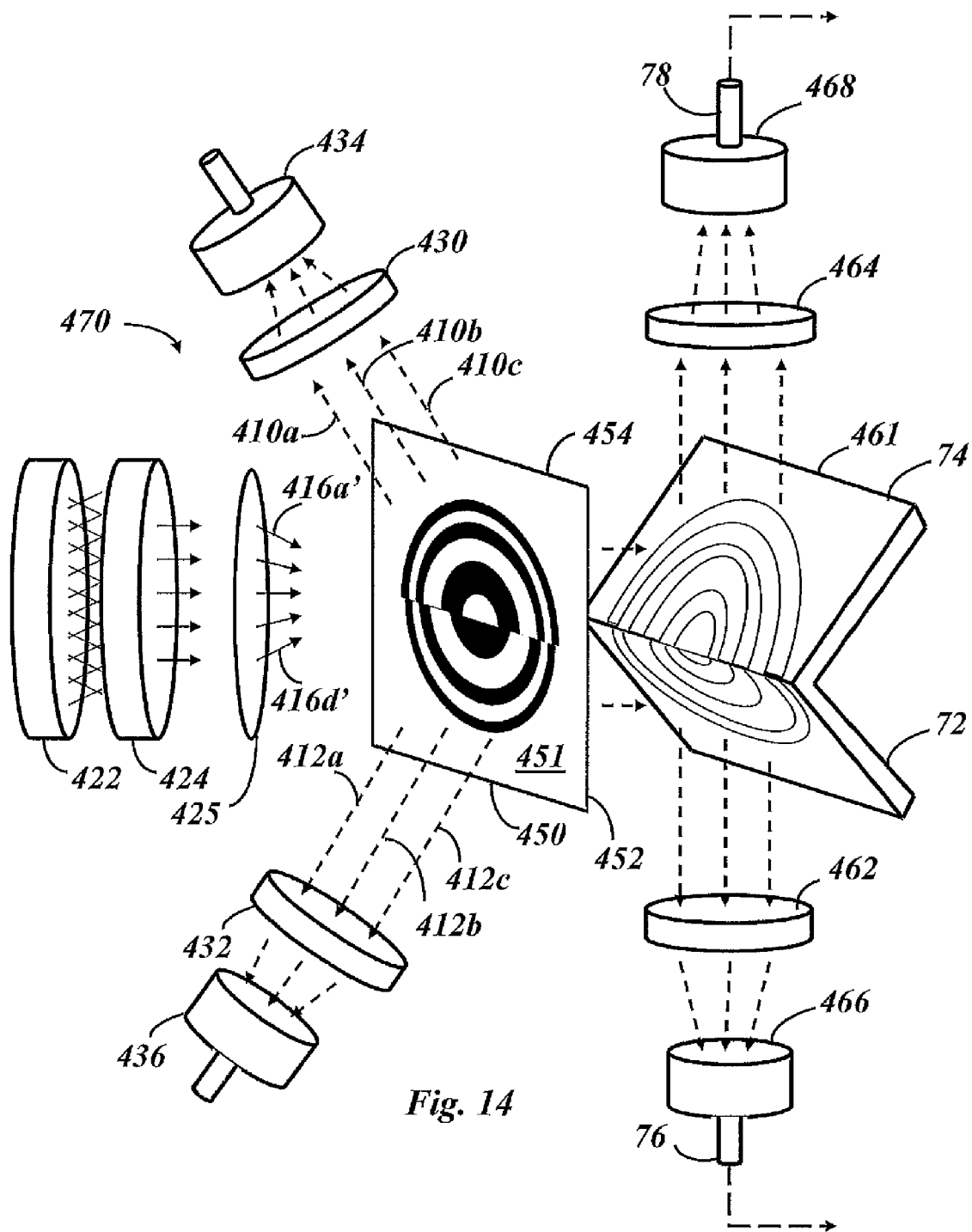
FIG. 14 is a schematic view of a fringe shift measurement system also configured to detect light reflected from the optical phase mask.

Referring now to FIG. 14, another embodiment of a fringe shift measurement system is illustrated generally at 470. This embodiment is similar to the embodiment illustrated in FIG. 7 and described above with the addition that light reflected from an optical mask is also focused onto detectors for further analysis. The fringe shift measurement system 470 includes first and second optical flats 422 and 424, a lens 425, an optical phase mask 450, a splitter 461, first and second concentrators 462 and 464 and first and second detectors 466 and 468. In the illustrated embodiment, the first and second optical flats 422 and 424, lens 425, optical phase mask 450, splitter 461, first and second concentrators 462 and 464 and first and second detectors 466 and 468 are the same as, or similar to, the first and second optical flats 22 and 24, lens 25, optical phase mask 50, splitter 61, first and second concentrators 62 and 64 and first and second detectors 66 and 68 illustrated in FIG. 7 and described above. However, it should be appreciated that in other embodiments, the first and second optical flats 422 and 424, lens 425, optical phase mask 450, splitter 461, first and second concentrators 462 and 464 and first and second detectors 466 and 468 can be different than the first and second optical flats 22 and 24, lens 25, optical phase mask 50, splitter 61, first and second concentrators 62 and 64 and first and second detectors 66 and 68.

Referring again to FIG. 14, the fringe shift measurement system 470 further includes third and fourth concentrators 430 and 432, which are the same as, or similar to, the first concentrator 462. The system 470 also includes third and fourth detectors 434 and 436, which are the same as, or similar to, the first detector 466. Alternatively, the third and fourth concentrators 430 and 432 can be different from the first concentrator 462 and the third and fourth detectors 434 and 436 can be different from the first detector 466.

In operation, the fringe shift measurement system 470 operates as described above and shown in FIG. 7 for the fringe shift measurement system 70 with the addition that a portion of the transmitted returns 416$a'$-416$d'$ is reflected off of the surface 451 of the mask 450. The reflected returns are indicated generally at 410$a$-410$c$ and 412$a$-412$c$. The reflected returns 410$a$-410$c$ are directed to the third concentrator 430, which in turn, focuses the reflected returns 410$a$-410$c$ to the third detector 434. Simultaneously, the reflected returns 412$a$-412$c$ are directed to the fourth concentrator 432, which in turn, focuses the reflected returns 412$a$-412$c$ to the fourth detector 436. As such, the fringe shift measurement system 470 provided digital signals from the intensities passing through the optical mask 450 as well as digital signals from the returns reflected from the optical mask 450. In the illustrated embodiment, the intensities passing through the optical mask 450 are out of phase with the reflected returns by an amount of 180°. However, in other embodiments, the intensities passing through the optical mask 450 can be out of phase with the reflected returns by other desired amounts. Advantageously, the doubling of the digital signals increases the signal to noise ratio of the instrument.

The principle and mode of operation of the fringe shift measurement system have been described in certain embodiments. However, it should be noted that the fringe shift measurement system may be practiced otherwise than as specifically illustrated and described without departing from its scope.

What is claimed is:

1. A fringe shift measurement system for determining the shift of fringes of an interferometer, the system comprising:
   an optical phase mask configured to receive light fringes from one or more optical flats, the optical phase mask having first and second halves, each of the first and second halves having alternating patterns of opaque rings and transparent rings, with the first half pattern being phase-shifted with respect to the second half pattern, each of the first and second halves configured to alternately block the incoming light fringes or allow the incoming light fringes to pass through the optical phase mask;
   a splitter having a plurality of segments, each of the segments configured to direct incoming light fringes from the optical phase mask in a desired direction;
   a plurality of concentrators positioned to receive light fringes from the splitter segments, the concentrators further configured to focus the light fringes in a desired location;
   a plurality of detectors is configured to receive the focused light fringes from the concentrators and further configured to convert the focused light fringes into digital signals; and
   a control unit configured to compare and analyze the digital signals.

2. The fringe shift measurement system of claim 1, wherein the first half pattern and the second half pattern are 90° out of phase with each other.

3. The fringe shift measurement system of claim 1, wherein the splitter has two segments forming an angle therebetween, the angle in a range of between 20° to about 70°.

4. The fringe shift measurement system of claim 1, wherein the concentrators are optical lens.

5. The fringe shift measurement system of claim 1, wherein the detectors are single point detectors.

6. The fringe shift measurement system of claim 1, wherein a radii of the rings of the first half match the radii of the fringes at some arbitrary point in their cycle and the radii of the second half rings match the radii of the fringes when the fringes have cycled through the phase shift.

7. The fringe shift measurement system of claim 1, wherein the opaque and transparent rings have blurred edges.

8. The fringe shift measurement system of claim 1, wherein the first and second segments of the splitter have mirrored surfaces.

9. The fringe shift measurement system of claim 1, wherein the rings of the optical phase mask are fixed.

10. The fringe shift measurement system of claim 1, wherein the optical phase mask has four quadrants.

11. A method of using a fringe shift measurement system, the method comprising the steps of:
    transmitting reflected light returns to one or more optical flats;
    generating light fringes from the transmitting reflected light returns;
    imparting the light fringes onto an optical phase mask, wherein the optical phase mask has a first half and a second half, each of the first and second halves having a plurality of opaque rings and a plurality of transparent rings;

blocking a portion of the light fringes imparted on the optical phase mask;

allowing a portion of the light fringes imparted on the optical phase mask to pass through the optical phase mask; and analyzing the light fringes passing through the optical phase mask.

12. The method of claim 11, wherein the first and second halves of the optical phase mask are shift radially with respect to each other.

* * * * *